(12) United States Patent
Suzuki

(10) Patent No.: US 12,286,153 B2
(45) Date of Patent: Apr. 29, 2025

(54) POWER STEERING CONTROLLER AND POWER STEERING CONTROL METHOD

(71) Applicant: ISUZU MOTORS LIMITED, Tokyo (JP)

(72) Inventor: Motoya Suzuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 213 days.

(21) Appl. No.: 18/018,834

(22) PCT Filed: Aug. 26, 2021

(86) PCT No.: PCT/JP2021/031328
§ 371 (c)(1),
(2) Date: Jan. 30, 2023

(87) PCT Pub. No.: WO2022/045242
PCT Pub. Date: Mar. 3, 2022

(65) Prior Publication Data
US 2024/0034408 A1    Feb. 1, 2024

(30) Foreign Application Priority Data
Aug. 27, 2020   (JP) ................. 2020-143599

(51) Int. Cl.
*B62D 15/02*    (2006.01)
(52) U.S. Cl.
CPC ......... *B62D 15/025* (2013.01); *B62D 15/022* (2013.01)
(58) Field of Classification Search
None
See application file for complete search history.

(56) References Cited

U.S. PATENT DOCUMENTS 6,907,333 B2 * 6/2005 Iwazaki ............... B62D 1/286
701/41
8,170,751 B2 * 5/2012 Lee ..................... B62D 15/025
180/204
(Continued)

FOREIGN PATENT DOCUMENTS

CN     105691445 A    6/2016
CN     106394668 A    2/2017
(Continued)

OTHER PUBLICATIONS

Patent Cooperation Treaty, International Search Report, Application No. PCT/JP2021/031328, dated Sep. 14, 2021, in 4 pages.

Primary Examiner — Kevin R Steckbauer
(74) Attorney, Agent, or Firm — PROCOPIO, CORY, HARGREAVES & SAVITCH LLP

(57) ABSTRACT

A power steering controller including: a first override determination part that determines whether automatic steering of a vehicle is possible on the basis of a state of the vehicle; a second override determination part that determines whether manual steering of the vehicle is possible on the basis of a state of a driver of the vehicle; and a driving mode switching part that switches between an automatic steering mode for automatically steering the vehicle, a manual steering mode for manually steering the vehicle, and a semi-automatic steering mode for automatically steering and manually steering the vehicle, on the basis of a determination result of the first override determination part and a determination result of the second override determination part.

9 Claims, 4 Drawing Sheets

(56) References Cited

U.S. PATENT DOCUMENTS

| | | | | |
|---|---|---|---|---|
| 8,930,079 B2* | 1/2015 | Lee | ............ | B62D 1/286 |
| | | | | 701/1 |
| 8,954,235 B2* | 2/2015 | Lee | ............ | B60W 50/10 |
| | | | | 701/41 |
| 9,073,576 B2* | 7/2015 | Lee | ............ | B62D 6/00 |
| 9,180,911 B2* | 11/2015 | Yoshihama | ............ | B62D 15/025 |
| 9,463,827 B2* | 10/2016 | Mose | ............ | B62D 5/0463 |
| 9,889,873 B2* | 2/2018 | Lueke | ............ | B62D 1/046 |
| 10,173,725 B2* | 1/2019 | Heo | ............ | B62D 15/021 |
| 10,377,417 B2* | 8/2019 | Schmiedhofer | ............ | B62D 1/286 |
| 10,589,777 B2* | 3/2020 | Hirate | ............ | B62D 5/0463 |
| 10,737,718 B2* | 8/2020 | Klesing | ............ | B62D 15/025 |
| 10,773,751 B2* | 9/2020 | Wanner | ............ | B62D 6/002 |
| 11,299,197 B2* | 4/2022 | Shoji | ............ | B60W 60/0053 |
| 11,529,994 B2* | 12/2022 | Irie | ............ | B62D 15/029 |
| 11,541,905 B2* | 1/2023 | Kim | ............ | B60W 50/06 |
| 11,603,128 B2* | 3/2023 | Suzuki | ............ | B62D 6/002 |
| 11,654,955 B2* | 5/2023 | Kobayashi | ............ | B60W 40/08 |
| | | | | 701/41 |
| 11,713,050 B2* | 8/2023 | Hwang | ............ | B62D 6/008 |
| | | | | 701/1 |
| 11,718,341 B2* | 8/2023 | Kunihiro | ............ | B62D 1/046 |
| | | | | 701/41 |
| 11,878,753 B2* | 1/2024 | Kreis | ............ | B62D 6/08 |
| 12,043,324 B2* | 7/2024 | Nishiguchi | ............ | B62D 5/0463 |
| 2003/0050748 A1* | 3/2003 | Iwazaki | ............ | B62D 1/286 |
| | | | | 180/443 |
| 2005/0240328 A1* | 10/2005 | Shirato | ............ | B62D 1/286 |
| | | | | 701/1 |
| 2006/0089770 A1* | 4/2006 | Ito | ............ | B62D 1/286 |
| | | | | 180/443 |
| 2010/0152952 A1* | 6/2010 | Lee | ............ | B62D 15/025 |
| | | | | 701/41 |
| 2010/0228417 A1* | 9/2010 | Lee | ............ | B62D 15/025 |
| | | | | 701/23 |
| 2012/0101685 A1* | 4/2012 | Engels | ............ | B62D 6/00 |
| | | | | 701/41 |
| 2012/0283910 A1* | 11/2012 | Lee | ............ | B62D 1/286 |
| | | | | 701/41 |
| 2013/0060414 A1* | 3/2013 | Lee | ............ | B62D 1/286 |
| | | | | 701/23 |
| 2013/0197713 A1* | 8/2013 | Yoshihama | ............ | B60W 50/10 |
| | | | | 701/1 |
| 2015/0375777 A1* | 12/2015 | Endo | ............ | B62D 5/0463 |
| | | | | 701/41 |
| 2016/0039428 A1* | 2/2016 | Odate | ............ | B60W 50/00 |
| | | | | 701/23 |
| 2016/0137221 A1* | 5/2016 | Mose | ............ | B62D 5/0463 |
| | | | | 701/41 |
| 2016/0152267 A1* | 6/2016 | Morimoto | ............ | B62D 15/025 |
| | | | | 701/41 |
| 2016/0167707 A1 | 6/2016 | Lee | | |
| 2016/0200348 A1* | 7/2016 | Lueke | ............ | A61B 5/1125 |
| | | | | 701/41 |
| 2017/0137060 A1* | 5/2017 | Wanner | ............ | B62D 1/286 |
| 2017/0203788 A1* | 7/2017 | Heo | ............ | B62D 15/025 |
| 2017/0247040 A1 | 8/2017 | Miller et al. | | |
| 2018/0050724 A1* | 2/2018 | Morselli | ............ | B62D 1/12 |
| 2018/0065657 A1* | 3/2018 | Hirate | ............ | B62D 5/0463 |
| 2018/0154936 A1* | 6/2018 | Yamasaki | ............ | B62D 15/0285 |
| 2018/0157256 A1 | 6/2018 | Oniwa et al. | | |
| 2018/0201309 A1* | 7/2018 | Schmiedhofer | ............ | B62D 6/08 |
| 2018/0257702 A1* | 9/2018 | Klesing | ............ | B62D 1/286 |
| 2019/0300013 A1 | 10/2019 | Shiraishi et al. | | |
| 2019/0315398 A1 | 10/2019 | Moreillon et al. | | |
| 2019/0367092 A1* | 12/2019 | Heo | ............ | B62D 15/025 |
| 2020/0317261 A1* | 10/2020 | Shoji | ............ | B60W 50/14 |
| 2021/0024087 A1* | 1/2021 | Kim | ............ | B60W 40/09 |
| 2021/0221425 A1* | 7/2021 | Kobayashi | ............ | B60W 30/08 |
| 2021/0309292 A1* | 10/2021 | Suzuki | ............ | B62D 6/008 |
| 2021/0354748 A1* | 11/2021 | Kunihiro | ............ | B62D 1/046 |
| 2022/0144295 A1* | 5/2022 | Hwang | ............ | B60W 50/12 |
| 2022/0204075 A1* | 6/2022 | Nishiguchi | ............ | B62D 5/0484 |
| 2022/0379956 A1* | 12/2022 | Williams | ............ | B62D 6/007 |
| 2023/0303062 A1* | 9/2023 | Krekel | ............ | B62D 15/0285 |
| 2023/0311980 A1* | 10/2023 | Igarashi | ............ | B62D 1/286 |
| | | | | 701/41 |
| 2024/0034408 A1* | 2/2024 | Suzuki | ............ | B62D 15/025 |
| 2024/0308579 A1* | 9/2024 | Aritomi | ............ | B62D 5/001 |

FOREIGN PATENT DOCUMENTS

| | | | | |
|---|---|---|---|---|
| CN | 107117162 A | | 9/2017 | |
| CN | 107531243 A | | 1/2018 | |
| CN | 110316195 A | | 10/2019 | |
| CN | 113682367 A | * | 11/2021 | ............ B62D 1/046 |
| CN | 116075458 A | * | 5/2023 | ............ B62D 15/022 |
| CN | 113682367 B | * | 7/2023 | ............ B62D 1/046 |
| DE | 112021004447 T5 | * | 6/2023 | ............ B62D 15/022 |
| DE | 102020127049 B4 | * | 8/2023 | ............ B60W 40/08 |
| EP | 1650101 A2 | * | 4/2006 | ............ B62D 1/286 |
| EP | 1650101 B1 | * | 9/2007 | ............ B62D 1/286 |
| JP | 2007-001475 A | | 1/2007 | |
| JP | 2014-106854 A | | 6/2014 | |
| JP | 2015063244 A | * | 4/2015 | |
| JP | 2016159781 A | * | 9/2016 | |
| JP | 2017-036025 A | | 2/2017 | |
| JP | 2018-149862 A | | 9/2018 | |
| JP | 2016-038846 A | | 4/2019 | |
| JP | 2019-051783 A | | 4/2019 | |
| JP | 2019-182393 A | | 10/2019 | |
| JP | 2021181259 A | * | 11/2021 | ............ B62D 1/046 |
| JP | 2022038890 A | * | 3/2022 | ............ B62D 15/022 |
| JP | 7200981 B2 | * | 1/2023 | ............ B62D 15/022 |
| JP | 7303153 B2 | * | 7/2023 | ............ B62D 1/046 |
| WO | WO-2016208399 A1 | * | 12/2016 | ............ B62D 1/286 |
| WO | WO-2022045242 A1 | * | 3/2022 | ............ B62D 15/022 |

* cited by examiner

POWER STEERING CONTROLLER AND POWER STEERING CONTROL METHOD

CROSS-REFERENCE TO RELATED APPLICATIONS

The present application is a U.S. National Stage entry of PCT Application number PCT/JP2021/031328, filed on Aug. 26, 2021, which claims priority under 35 U.S.C § 119 (a) to Japanese Patent Application No. 2020-143599, filed on Aug. 27, 2020, contents of which are incorporated herein by reference in their entirety.

TECHNICAL FIELD

The present invention relates to a power steering controller and a power steering control method.

BACKGROUND OF THE INVENTION

Conventionally, a vehicle having an automatic steering mode for automatically steering the vehicle, a manual steering mode for manually steering the vehicle, and a semi-automatic steering mode for automatically steering and manually steering the vehicle has been known. Patent Document 1 discloses an electric power steering apparatus that performs cooperative control in which manual steering can be performed while mainly performing automatic steering control during switching between manual steering control and automatic steering control on the basis of hands-on-off determination results.

PRIOR ART

Patent Document

Patent Document 1: Japanese Unexamined Patent Application Publication No. 2019-182393

BRIEF DESCRIPTION OF THE INVENTION

Problem to be Solved by the Invention

A vehicle may be provided with a power steering controller that performs semi-automatic steering during switching between automatic steering and manual steering on the basis of a single override determination. In this case, it is difficult to perform control suitable for a state of the vehicle or a state of a driver of the vehicle because it is not determined in which of the three modes the vehicle is to be driven depending on various states.

The present invention focuses on this point, and its object is to provide a power steering controller which can easily perform control suitable for a state of a vehicle or a state of a driver of the vehicle.

Means for Solving the Problem

A first aspect of the present invention provides a power steering controller including: a first override determination part that determines whether automatic steering of a vehicle is possible on the basis of a state of the vehicle; a second override determination part that determines whether manual steering of the vehicle is possible on the basis of a state of a driver of the vehicle; and a driving mode switching part that switches between an automatic steering mode for automatically steering the vehicle, a manual steering mode for manually steering the vehicle, and a semi-automatic steering mode for automatically steering and manually steering the vehicle, on the basis of a determination result of the first override determination part and a determination result of the second override determination part.

The power steering controller may further include: a torque detection part that detects torque generated in a steering wheel of the vehicle; and a contact detection part that detects whether the driver is touching the steering wheel, wherein the driving mode switching part may switch to the manual steering mode in a case where (i) the first override determination part determines that the automatic steering is not possible because the torque detected by the torque detection part is equal to or greater than a predetermined first threshold value and (ii) the second override determination part determines that the manual steering is possible, due to the contact detection part detecting that the driver is touching the steering wheel.

The power steering controller may further include a steering angle detection part that detects a steering angle of the steering wheel, wherein the contact detection part may calculate an estimated value of driver input torque applied to the steering wheel on the basis of the torque detected by the torque detection part and the steering angle detected by the steering angle detection part, and determine whether the driver is touching the steering wheel on the basis of the calculated estimated value of the driver input torque.

The power steering controller may further include: a torque detection part that detects torque generated in a steering wheel of the vehicle; and a contact detection part that detects whether the driver is touching the steering wheel, wherein the driving mode switching part may switch to the semi-automatic steering mode in a case where (i) the first override determination part determines that the automatic steering is not possible because the torque detected by the torque detection part is equal to or greater than a predetermined first threshold value and (ii) the second override determination part determines that the manual steering is not possible, due to the contact detection part detecting that the driver is not touching the steering wheel.

The power steering controller may further include: a torque detection part that detects torque generated in a steering wheel of the vehicle; and a contact detection part that detects whether the driver is touching the steering wheel, wherein the driving mode switching part may switch to the semi-automatic steering mode in a case where (i) the first override determination part determines that the automatic steering is possible because the torque detected by the torque detection part is less than a predetermined first threshold value and (ii) the second override determination part determines that the manual steering is possible, due to the contact detection part detecting that the driver is touching the steering wheel.

The power steering controller may further include: a torque detection part that detects torque generated in a steering wheel of the vehicle; and a contact detection part that detects whether the driver is touching the steering wheel, wherein the driving mode switching part may switch to the automatic steering mode in a case where the first override determination part determines that the automatic steering is possible because the torque detected by the torque detection part is less than a predetermined first threshold value and (ii) the second override determination part determines that the manual steering is not possible, due to the contact detection part detecting that the driver is not touching the steering wheel.

The power steering controller may further include: a steering angle detection part that detects a steering angular velocity of a steering wheel of the vehicle, wherein the first override determination part may determine whether the automatic steering of the vehicle is possible on the basis of the steering angular velocity detected by the steering angle detection part.

The power steering controller may further include: a failure detection part that detects whether a first detector that detects torque generated in a steering wheel of the vehicle or a second detector that detects a steering angular velocity of the steering wheel is broken, wherein the first override determination part may determine whether the automatic steering of the vehicle is possible on the basis of a detection result of the failure detection part.

The power steering controller may further include: a target steering angle determination part that determines whether an appropriate target steering angle is generated by an ECU of the vehicle, wherein the first override determination part may determine whether the automatic steering of the vehicle is possible on the basis of a determination result of the target steering angle determination part.

The power steering controller may further include an operation detection part that detects whether the driver has performed an operation, wherein the second override determination part may determine whether the manual steering of the vehicle is possible on the basis of a detection result of the operation detection part.

A second aspect of the present invention provides a power steering control method implemented by a computer, the method including: a first override determination step of determining whether automatic steering of a vehicle is possible on the basis of a state of the vehicle; a second override determination step of determining whether manual steering of the vehicle is possible on the basis of a state of a driver of the vehicle; and a driving mode switching step of switching between an automatic steering mode in which the vehicle is automatically steered, a manual steering mode in which the vehicle is manually steered, and a semi-automatic steering mode in which the vehicle is automatically steered and manually steered, on the basis of a determination result of the first override determination step and a determination result of the second override determination step.

Effect of the Invention

The present invention can achieve, with a power steering controller, an effect of easily performing control suitable for a state of a vehicle or a state of a driver of the vehicle.

DESCRIPTION OF EMBODIMENTS

[Configuration of an Automatic Steering System 10]

Figure 1:
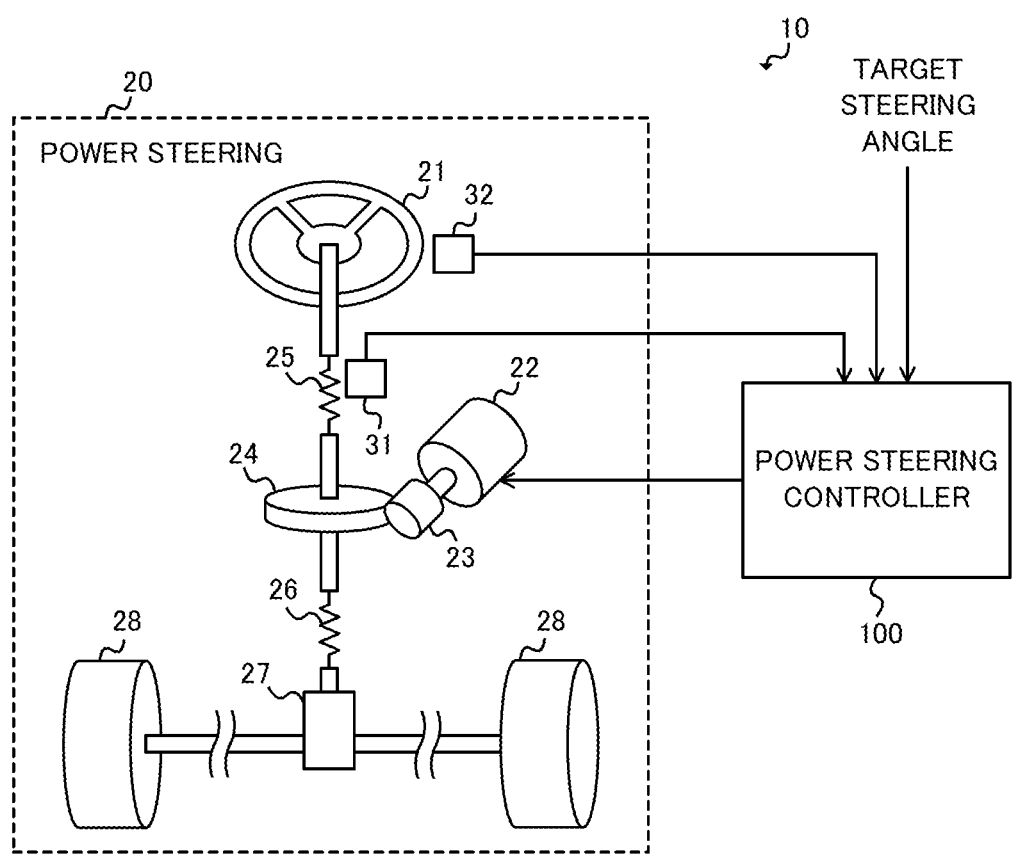
FIG. 1 shows a configuration of an automatic steering system according to the present embodiment.

FIG. 1 is a diagram showing a configuration of an automatic steering system 10 according to the present embodiment. The automatic steering system 10 is a system installed in a vehicle such as a passenger car, a truck, or the like. The automatic steering system 10 is a system for enabling steering of the vehicle by either automatic steering, manual steering, or semi-automatic steering.

The automatic steering mode is a mode in which the vehicle is steered only by torque generated from a motor 22. In the manual steering mode, the torque generated from the motor 22 is set to 0, and the vehicle is steered only by torque applied to a steering wheel 21 by a driver of the vehicle. The semi-automatic steering mode is a mode in which the vehicle is steered by the torque generated from the motor 22 and the torque applied to the steering wheel 21 by the driver of the vehicle. In the semi-automatic steering, the automatic steering and the manual steering can be mixed, and a steering intention of the driver of the vehicle can be reflected without stopping the automatic steering.

The automatic steering system 10 includes power steering 20 and a power steering controller 100. The power steering 20 assists a rotational operation of the steering wheel 21 so that the driver of the vehicle can smoothly turn the steering wheel 21. Therefore, the driver can turn the steering wheel 21 with smaller input torque.

The power steering 20 includes the steering wheel 21, the motor 22, a worm 23, a worm wheel 24, a first torsion bar 25, a second torsion bar 26, an actuator 27, wheels 28, a first detector 31, and a second detector 32.

The driver adjusts a traveling direction of the vehicle by operating the steering wheel 21, which is annular in shape. Here, a rotation angle of the steering wheel 21 with respect to a reference position is referred to as a steering angle. A state in which the driver operates the steering wheel 21 is referred to as a hands-on state, and a state in which the driver does not operate the steering wheel 21 is referred to as a hands-off state.

The motor 22 drives the steering wheel 21 in accordance with an input drive signal. The drive signal is a signal specifying a value of current applied to the motor 22, for example. The motor 22 rotates the worm 23 and rotates the worm wheel 24 that engages with the worm 23. One end portion of a shaft of the worm wheel 24 is connected to the steering wheel 21 via the first torsion bar 25.

An end portion opposite to said end portion of the shaft of the worm wheel 24 is connected to the actuator 27 via the second torsion bar 26. The actuator 27 changes an angle of the wheels 28 according to force transmitted from the worm wheel 24. The actuator 27 is a hydraulic actuator, for example.

The first detector 31 detects steering torque applied to the steering wheel 21. The first detector 31 is provided in the first torsion bar 25 and detects a restoring force of the first torsion bar 25 as the steering torque, for example.

The second detector 32 detects a steering angle and a steering angular velocity of the steering wheel 21. The second detector 32 is provided in the steering wheel 21 and detects a rotation angle with respect to a steering angle of the steering wheel 21 that makes the vehicle go straight as the steering angle, for example. As an example, the reference angle is 0 degrees. Alternatively, the second detector 32 may be provided in the motor 22. In this case, the second detector 32 detects an angle at which the motor 22 rotates the worm 23, and outputs an angle of the steering wheel 21 corresponding to the detected angle as the steering angle, for example.

The power steering controller 100 controls the power steering 20 as described above. The power steering controller 100 supplies the drive signal for driving the motor 22 to the motor 22 on the basis of (i) an input target steering angle and (ii) the steering torque and steering angle acquired from the power steering 20. The power steering controller 100 acquires information on the target steering angle from an engine control part (ECU) or the like installed in the vehicle, for example.

[Configuration of the Power Steering Controller 100]

Figure 2:
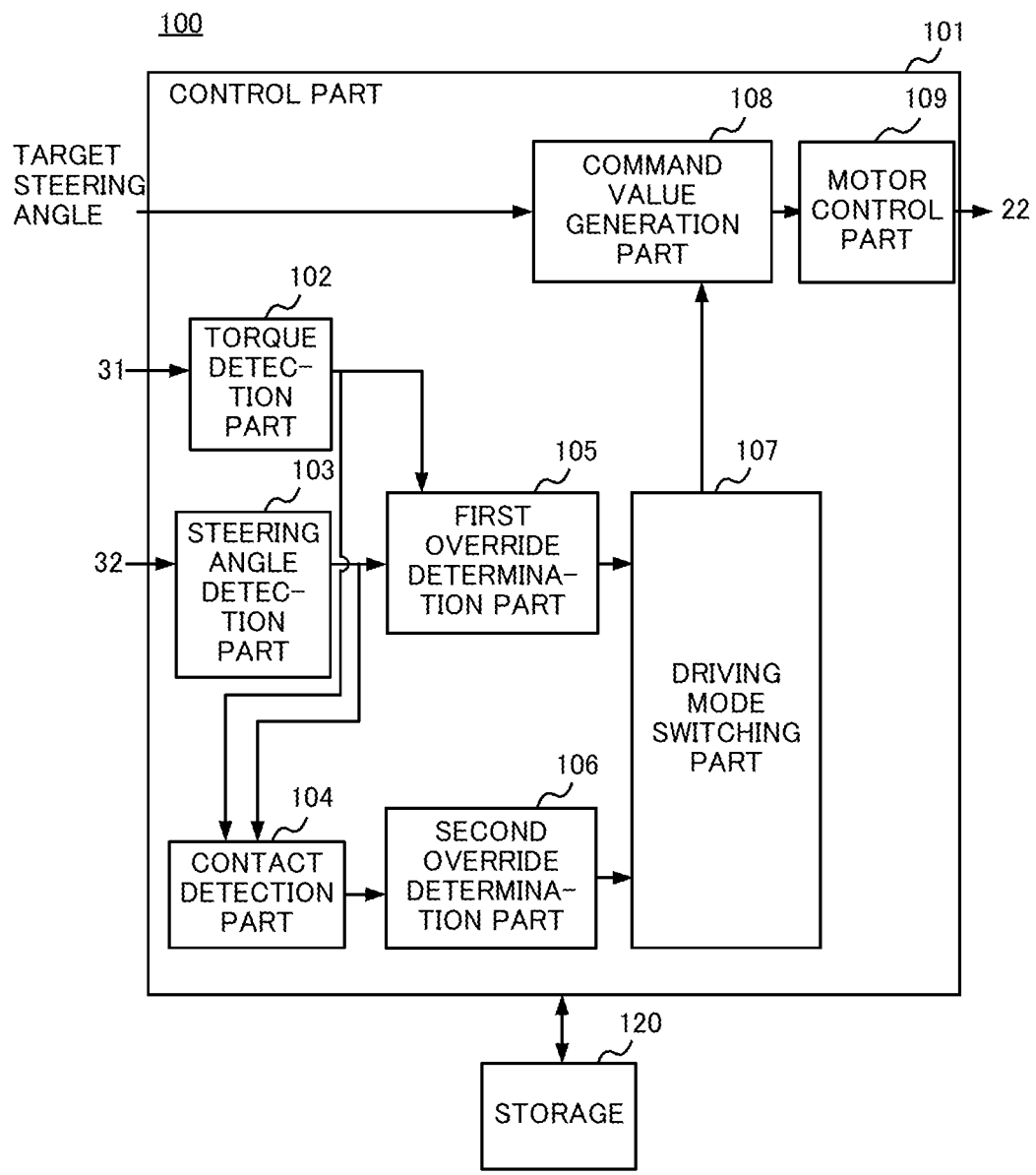
FIG. 2 shows a configuration of a power steering controller according to the present embodiment.

FIG. 2 is a diagram showing a configuration of the power steering controller 100 according to the present embodiment. Next, the configuration of the power steering controller 100 will be described. The power steering controller 100 includes a control part 101 and a storage 120.

The control part 101 is a central processing unit (CPU), for example, and functions as a torque detection part 102, a steering angle detection part 103, a contact detection part 104, a first override determination part 105, a second override determination part 106, a driving mode switching part 107, a command value generation part 108, and a motor control part 109 by executing a program stored in the storage 120. Details of the control part 101 will be described later.

The storage 120 includes a read only memory (ROM) and a random access memory (RAM). The storage 120 stores a program executed by the control part 101. The storage 120 stores various types of data used by the control part 101 to control the power steering 20.

The torque detection part 102 detects torque generated in the steering wheel 21 of the vehicle. The torque detection part 102 acquires steering torque information from the first detector 31. Then, the torque detection part 102 notifies the acquired steering torque information to the first override determination part 105 and the contact detection part 104.

The steering angle detection part 103 detects the steering angle and steering angular velocity of the steering wheel 21 of the vehicle. The steering angle detection part 103 acquires steering angle information and steering angular velocity information from the second detector 32. Then, the steering angle detection part 103 notifies the contact detection part 104 of the acquired steering angle information. The steering angle detection part 103 notifies the first override determination part 105 of the acquired steering angular velocity information.

The contact detection part 104 detects whether the driver of the vehicle is touching the steering wheel 21. That is, the contact detection part 104 detects whether the driver of the vehicle is in the hands-on state or hands-off state with respect to the steering wheel 21.

The contact detection part 104 acquires the steering torque information from the torque detection part 102. The contact detection part 104 acquires the steering angle information from the steering angle detection part 103. The contact detection part 104 calculates an estimated value of driver input torque applied to the steering wheel 21 on the basis of the steering torque information acquired from the torque detection part 102 and the steering angle information acquired from the steering angle detection part 103, for example. The driver input torque is torque applied to the steering wheel 21 by a driver of a vehicle. Specifically, the contact detection part 104 calculates a differential equation in which the steering torque and the steering angle are applied to an equation of state which is converted from an equation of motion of the steering wheel 21, for example.

The contact detection part 104 calculates an estimated value of the driver input torque applied to the steering wheel 21 by solving the calculated equation.

Then, the contact detection part 104 determines whether the driver of the vehicle is touching the steering wheel 21 on the basis of the estimated value of the calculated driver input torque. Specifically, when the estimated value of the driver input torque is equal to or greater than a threshold value, the contact detection part 104 determines that the driver of the vehicle is touching the steering wheel 21, for example. On the other hand, when the estimated value of the driver input torque is less than the threshold value, the contact detection part 104 determines that the driver of the vehicle is not touching the steering wheel 21, for example. The contact detection part 104 notifies the second override determination part 106 about a determination result of said determination.

The first override determination part 105 determines whether the automatic steering of the vehicle is possible on the basis of a state of the vehicle. The first override determination part 105 acquires the steering torque information from the torque detection part 102. The first override determination part 105 acquires the steering angular velocity information from the steering angle detection part 103.

The first override determination part 105 determines whether the automatic steering of the vehicle is possible on the basis of whether the torque acquired from the torque detection part 102 is equal to or greater than a predetermined first threshold value. The first threshold value is torque with which it is difficult to continue the automatic steering of the vehicle. When the torque detected by the torque detection part 102 is equal to or greater than a predetermined first threshold value, the first override determination part 105 determines that automatic steering is not possible. When the torque detected by the torque detection part 102 is less than the predetermined first threshold value, the first override determination part 105 determines that automatic steering is possible. Then, the first override determination part 105 notifies the driving mode switching part 107 about a determination result of said determination.

The second override determination part 106 determines whether the manual steering of the vehicle is possible on the basis of a state of the driver of the vehicle. The second override determination part 106 acquires, from the contact detection part 104, a determination result obtained by determining whether the driver of the vehicle is touching the steering wheel 21.

The second override determination part 106 determines whether the manual steering of the vehicle is possible on the basis of the determination result of determining whether the driver of the vehicle is touching the steering wheel 21, which is acquired from the contact detection part 104. When the contact detection part 104 detects that the driver of the vehicle is touching the steering wheel 21, the second override determination part 106 determines that manual steering is possible. When the contact detection part 104 detects that the driver of the vehicle is not touching the steering wheel 21, the second override determination part 106 determines that the manual steering is not possible. Then, the second override determination part 106 notifies the driving mode switching part 107 about a determination result of said determination.

The driving mode switching part 107 switches between (i) an automatic steering mode in which a vehicle is automatically steered, (ii) a manual steering mode in which a vehicle is manually steered, and (iii) a semi-automatic steering mode, on the basis of the determination result of the first override determination part 105 and the determination result of the second override determination part 106.

The power steering controller 100 includes the driving mode switching part 107 that switches between the automatic steering mode, the manual steering mode, and the semi-automatic steering mode on the basis of the determination result of the first override determination part 105 and the determination result of the second override determination part 106. Therefore, the power steering controller 100 determines in which of three modes the vehicle is to be driven on the basis of a plurality of override determinations. Accordingly, the power steering controller 100 can easily perform control suitable for the state of the vehicle or the state of the driver of the vehicle.

The driving mode switching part 107 acquires the determination result obtained by the first override determination part 105 and the determination result obtained by the second override determination part 106. The driving mode switching part 107 selects, as a driving mode for the vehicle, which of the automatic steering mode, the manual steering mode, or the semi-automatic steering mode the vehicle is to be steered in, on the basis of the determination result obtained by the first override determination part 105 and the determination result obtained by the second override determination part 106. The driving mode switching part 107 notifies the command value generation part 108 of information indicating the selected driving mode.

When a determination result indicating that automatic steering is not possible is acquired from the first override determination part 105 and a determination result indicating that manual steering is possible is acquired from the second override determination part 106, the driving mode switching part 107 selects the manual steering mode as the driving mode. The driving mode switching part 107 notifies the command value generation part 108 of information indicating the manual steering mode.

When a determination result indicating that automatic steering is not possible is acquired from the first override determination part 105 and a determination result indicating that manual steering is not possible is acquired from the second override determination part 106, the driving mode switching part 107 selects the semi-automatic steering mode as the driving mode. The driving mode switching part 107 notifies the command value generation part 108 of information indicating the semi-automatic steering mode.

When a determination result indicating that automatic steering is possible is acquired from the first override determination part 105 and a determination result indicating that manual steering is possible is acquired from the second override determination part 106, the driving mode switching part 107 selects the semi-automatic steering mode as the driving mode. The driving mode switching part 107 notifies the command value generation part 108 of information indicating the semi-automatic steering mode.

When a determination result indicating that automatic steering is possible is acquired from the first override determination part 105 and a determination result indicating that manual steering is not possible is acquired from the second override determination part 106, the driving mode switching part 107 selects the automatic steering mode as the driving mode. The driving mode switching part 107 notifies the command value generation part 108 of information indicating the automatic steering mode.

The command value generation part 108 generates a command value for controlling the motor 22 on the basis of the target steering angle and the driving mode selected by the driving mode switching part 107, and outputs the generated command value to the motor control part 109. The command value generation part 108 acquires target steering angle information from the ECU, for example. The command value generation part 108 acquires the information indicating the driving mode selected by the driving mode switching part 107 from the driving mode switching part 107. The command value generation part 108 generates the command value for controlling the motor 22 on the basis of the acquired target steering angle information and the acquired information indicating the driving mode, and notifies the motor control part 109 of information showing the generated command value.

When the information indicating the automatic steering mode or the information indicating the semi-automatic steering mode as the driving mode is acquired, the command value generation part 108 generates a command value such that the steering angle of the steering wheel 21 becomes the acquired target steering angle. When the information indicating the manual steering mode as the driving mode is acquired, the command value generation part 108 generates a command value that causes the motor 22 to cease operating.

The motor control part 109 controls the motor 22. The motor control part 109 generates a drive signal corresponding to the command value acquired from the command value generation part 108 and supplies the drive signal to the motor 22.

[Operation Flow of the Power Steering Controller 100]

Figure 3:
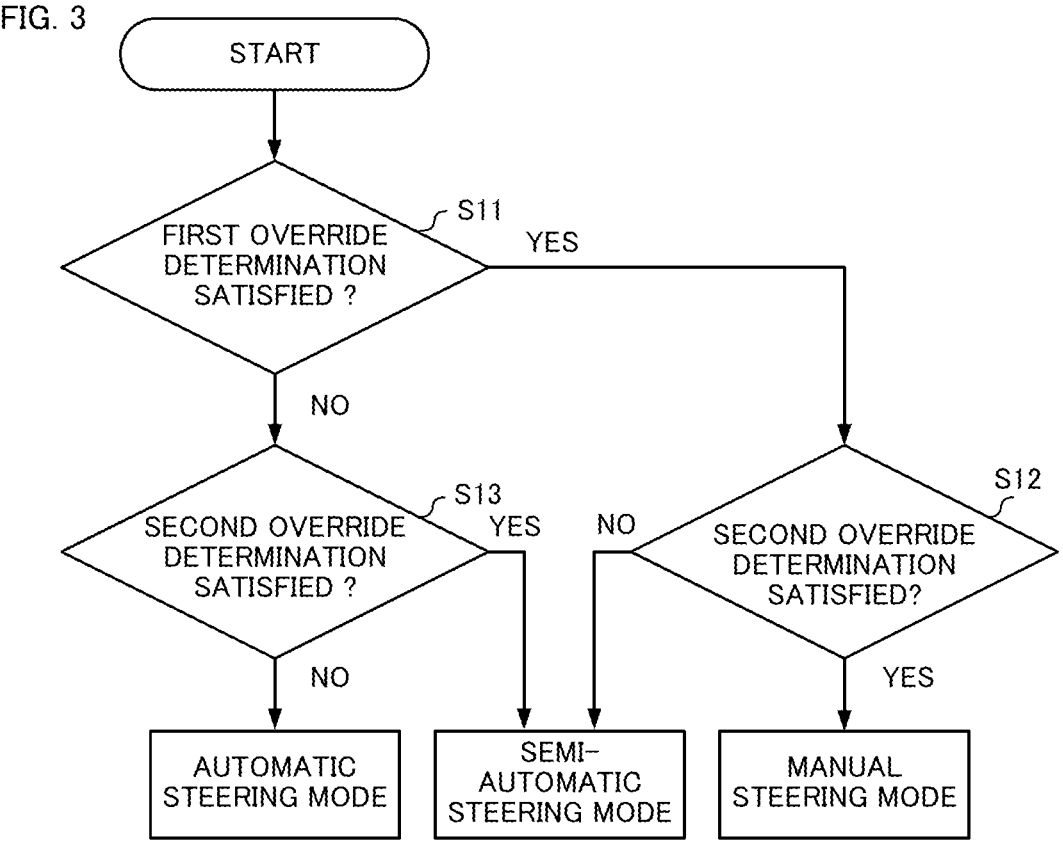
FIG. 3 shows an operation flow of the power steering controller according to the present embodiment.

FIG. 3 is a diagram showing an operation flow of the power steering controller 100 according to the present embodiment. First, the first override determination part 105 determines whether the automatic steering of a vehicle is possible on the basis of a state of the vehicle (S11). Specifically, the first override determination part 105 determines whether the automatic steering of the vehicle is possible on the basis of information indicating whether torque detected by the torque detection part 102 is equal to or greater than a predetermined first threshold value.

When the first override determination part 105 determines that the automatic steering of the vehicle is not possible on the basis of the state of the vehicle (YES in S11), the second override determination part 106 determines whether the manual steering of the vehicle is possible on the basis of a state of the driver of the vehicle (S12). Specifically, when the first override determination part 105 determines that the automatic steering is not possible, the second override determination part 106 determines whether the manual steering of the vehicle is possible on the basis of information indicating whether the driver of the vehicle is touching the steering wheel 21.

For example, cases in which the torque detected by the torque detection part 102 is equal to or greater than the predetermined first threshold value and the first override determination part 105 determines that the automatic steering of the vehicle is not possible include the following situations: A case where the torque detected by the torque detection part 102 becomes equal to or greater than the predetermined first threshold value due to the driver of the vehicle operating the steering wheel 21 while the vehicle is traveling in the automatic steering mode or the semi-automatic steering mode; A case where the torque detected by the torque detection part 102 becomes equal to or greater than the predetermined first threshold value as a result of sudden steering due to an occurrence of a malfunction in the automatic steering system 10 while the driver of the vehicle is not operating the steering wheel 21.

When the second override determination part 106 determines that the manual steering of the vehicle is possible on the basis of the state of the driver of the vehicle (YES in S12), the driving mode switching part 107 switches to the manual steering mode. Specifically, when the second override determination part 106 determines that manual steering is possible due to the contact detection part 104 detecting that the driver of the vehicle is touching the steering wheel 21, the driving mode switching part 107 switches to the manual steering mode. By having the driving mode switching part 107 switch to the manual steering mode in this manner, the power steering controller 100 enables the driver to steer the vehicle when the automatic steering of the vehicle is not possible.

When the second override determination part 106 determines that the manual steering of the vehicle is not possible on the basis of the state of the driver of the vehicle (NO in S12), the driving mode switching part 107 switches to the semi-automatic steering mode. Specifically, when the second override determination part 106 determines that manual steering is not possible due to the contact detection part 104 detecting that the driver of the vehicle is not touching the steering wheel 21, the driving mode switching part 107 switches to the semi-automatic steering mode. By having the driving mode switching part 107 switch to the semi-automatic steering mode in this manner, the power steering controller 100 enables the vehicle to be semi-automatically steered in a case where the automatic steering of the vehicle is not possible and the manual steering by the driver is not possible.

When the first override determination part 105 determines that the automatic steering of the vehicle is possible on the basis of the state of the vehicle (NO in S11), the second override determination part 106 determines whether the manual steering of the vehicle is possible on the basis of the state of the driver of the vehicle (S13). Specifically, when the first override determination part 105 determines that the automatic steering is possible, the second override determination part 106 determines whether the manual steering of the vehicle is possible on the basis of the information indicating whether the driver of the vehicle is touching the steering wheel 21.

When the second override determination part 106 determines that the manual steering of the vehicle is possible on the basis of the state of the driver of the vehicle (YES in S13), the driving mode switching part 107 switches to the semi-automatic steering mode. Specifically, when the second override determination part 106 determines that the manual steering is possible due to the contact detection part 104 detecting that the driver of the vehicle is touching the steering wheel 21, the driving mode switching part 107 switches to the semi-automatic steering mode. By having the driving mode switching part 107 switch to the semi-automatic steering mode in this manner, the power steering controller 100 enables the vehicle to be semi-automatically steered in a case where the automatic steering of the vehicle is possible and the manual steering by the driver is possible.

When the second override determination part 106 determines that the manual steering of the vehicle is not possible on the basis of the state of the driver of the vehicle (NO in S13), the driving mode switching part 107 switches to the automatic steering mode. Specifically, when the second override determination part 106 determines that manual steering is not possible due to the contact detection part 104 detecting that the driver of the vehicle is not touching the steering wheel 21, the driving mode switching part 107 switches to the automatic steering mode. By having the driving mode switching part 107 switch to the automatic steering mode in this manner, the power steering controller 100 enables the vehicle to be automatically steered in a case where the manual steering by the driver is not possible.

Variation Example 1

In the above embodiment, cases have been shown where the first override determination part 105 determines whether the automatic steering is possible on the basis of the information indicating whether the torque detected by the torque detection part 102 is equal to or greater than the predetermined first threshold value, but the present invention is not limited thereto. The first override determination part 105 may determine whether the automatic steering is possible on the basis of information indicating whether the steering angular velocity detected by the steering angle detection part 103 is equal to or greater than a predetermined second threshold value. The second threshold value is a steering angular velocity at which it is difficult to continue steering the vehicle.

When the steering angular velocity detected by the steering angle detection part 103 is equal to or greater than the predetermined second threshold value, the first override determination part 105 determines that automatic steering is not possible. When the steering angular velocity detected by the steering angle detection part 103 is less than the predetermined second threshold value, the first override determination part 105 determines that automatic steering is possible.

Variation Example 2

In the above embodiment, cases have been shown where the first override determination part 105 determines whether the automatic steering is possible on the basis of the information indicating whether the torque detected by the torque detection part 102 is equal to or greater than the predetermined first threshold value, but the present invention is not limited thereto. The first override determination part 105 may determine whether the automatic steering is possible on the basis of information indicating whether the first detector 31 or the second detector 32 is broken.

In this case, the power steering controller 100 may include a failure detection part that detects information indicating whether the first detector 31 or the second detector 32 is broken, for example. Alternatively, by determining whether a detection value detected by the first detector 31 or the second detector 32 is included in a predetermined range, the power steering controller 100 may determine whether the first detector 31 or the second detector 32 is broken, for example.

When the first detector 31 or the second detector 32 is not working, the first override determination part 105 determines that the automatic steering is not possible. When the first detector 31 or the second detector 32 is working, the first override determination part 105 determines that the automatic steering is possible.

Variation Example 3

In the above embodiment, cases have been shown where the first override determination part 105 determines whether the automatic steering is possible on the basis of the information indicating whether the torque detected by the torque detection part 102 is equal to or greater than the predetermined first threshold value, but the present invention is not limited thereto.

The first override determination part 105 may determine whether the automatic steering is possible on the basis of information indicating whether an abnormality has occurred in the ECU of the vehicle. In this case, the first override determination part 105 may determine whether the automatic steering is possible on the basis of whether an appropriate target steering angle is generated by the ECU, for example. In the determination as to whether the appropriate target steering angle is generated by the ECU, if the target steering angle generated by the ECU is not included within a range of appropriate values, for example, a range of 800 degrees to −800 degrees, which is a physical constraint of the steering wheel 21, the first override determination part 105 may determine that ECU failed to generate the target steering angle, for example.

When the ECU does not generate the appropriate target steering angle, the first override determination part 105 determines that the automatic steering is not possible. When the appropriate target steering angle is generated by the ECU, the first override determination part 105 determines that the automatic steering is possible.

Further, when the appropriate target steering angle cannot be generated due to an occurrence of an abnormality only in a target steering angle calculation part of the ECU, the command value generation part 108 may use a torque command value of the motor 22 as a value of an assist torque, for example. In the case where the appropriate target steering angle cannot be generated due to the occurrence of an abnormality only in the target steering angle calculation part of the ECU, an operation of providing assistance for assisting the driver of the vehicle is initiated on the basis of the steering torque detected by the first detector 31. The assist torque is a command value for providing assistance for assisting the driver in the above case.

Variation Example 4

In the above embodiment, cases have been shown where the first override determination part 105 determines whether the automatic steering is possible on the basis of the information indicating whether the torque detected by the torque detection part 102 is equal to or greater than the predetermined first threshold value, but the present invention is not limited thereto.

The first override determination part 105 may determine whether the automatic steering is possible on the basis of a signal value of a vehicle controller area network (CAN). The signal value of the vehicle CAN includes a detection signal of a white line, a yaw rate, a lateral acceleration, and a lateral deviation (difference between a target value and a self-position of a vehicle) of a vehicle, for example. The first override determination part 105 determines that the automatic steering of the vehicle is not possible when sight of a white line is lost due to some factor during tracking of the white line, for example. However, the first override determination part 105 determines that the automatic steering is possible even when the sight of the white line is lost in such cases as (i) a vehicle in front is traveling in front of the vehicle and the control is switched to follow the vehicle in front, and (ii) if the vehicle travels by estimating the self-position from map data, for example.

Variation Example 5

Figure 4:
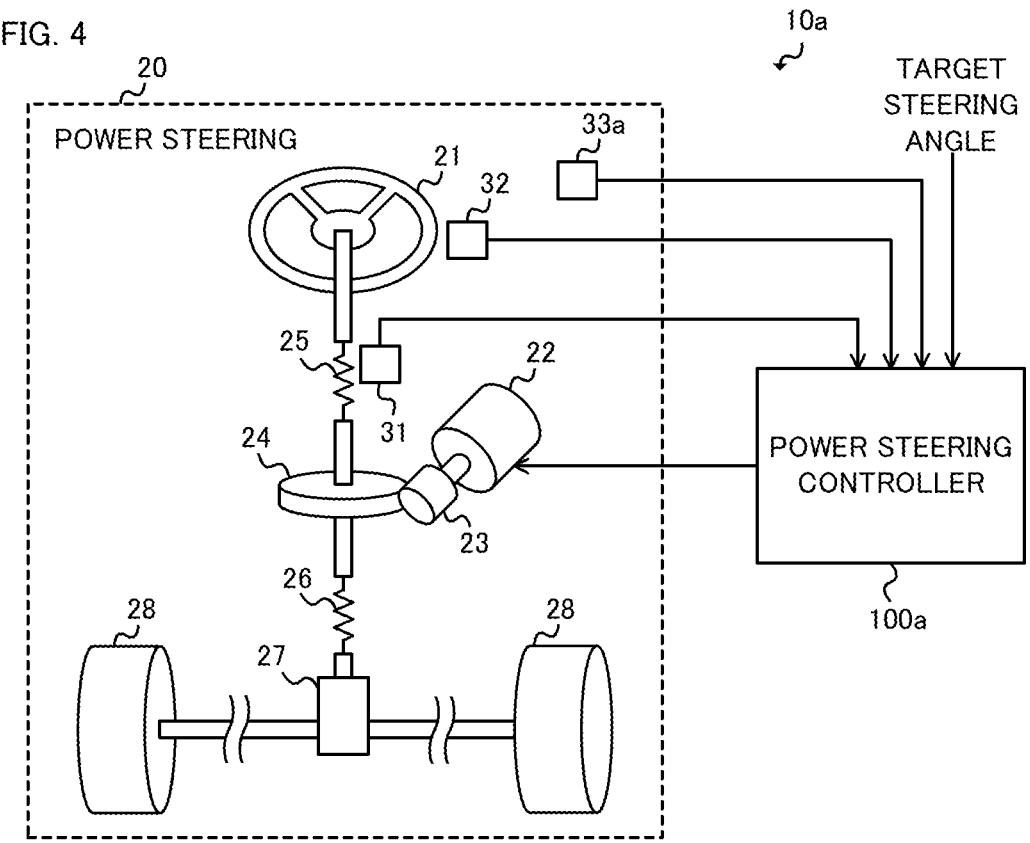
FIG. 4 shows a configuration of an automatic steering system as Variation Example 5.
Figure 5:
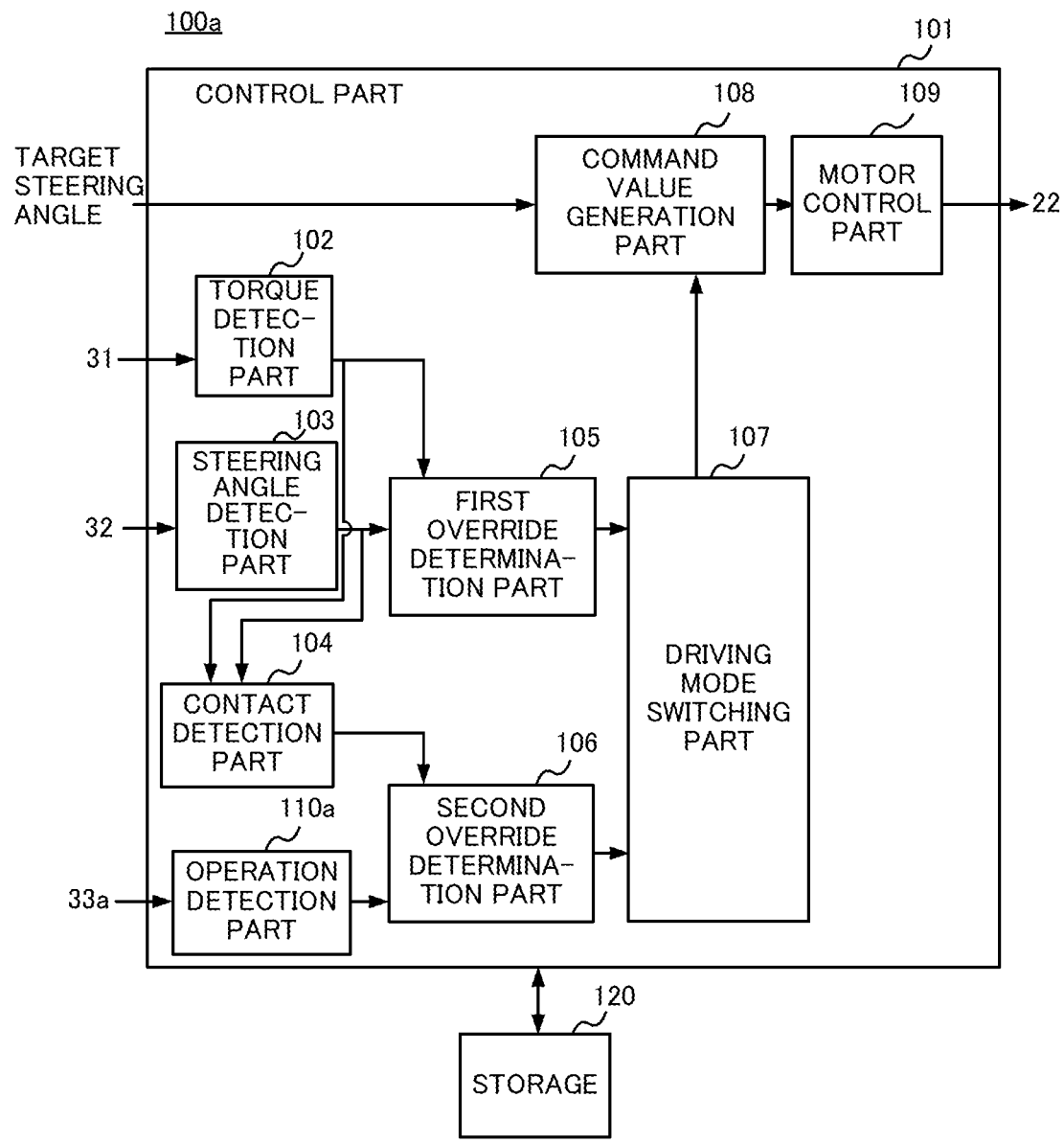
FIG. 5 shows a configuration of a power steering controller as Variation Example 5.

FIG. 4 is a diagram showing a configuration of an automatic steering system 10a as Variation Example 5. FIG. 5 is a diagram showing a configuration of a power steering controller 100a as Variation Example 5. In the above embodiment, cases have been shown where the second override determination part 106 determines whether the manual steering is possible on the basis of the information, detected by the contact detection part 104, indicating whether the driver of the vehicle is touching the steering wheel 21, but the present invention is not limited thereto. The automatic steering system 10a includes an operation part 33a, the power steering controller 100a includes an operation detection part 110a, and the second override determination part 106 may determine whether the manual steering is possible on the basis of information indicating whether or not the driver of the vehicle has performed an operation, the information being detected by the operation detection part 110a.

As shown in FIG. 4, the automatic steering system 10a includes the operation part 33a. The operation part 33a is a switch for exiting the automatic steering mode or the semi-automatic steering mode, for example. Specifically, the operation part 30a is a switch for switching from the automatic steering mode to the manual steering mode when the driver of the vehicle operates the operation part 33a in the automatic steering mode, and switching from the semi-automatic steering mode to the manual steering mode when the driver operates the operation part 33a in the semi-automatic steering mode. The operation part 33a outputs information indicating an operation of the driver of the vehicle to the operation detection part 110a. The operation part 33a is provided on an instrument panel of the vehicle, for example.

As shown in FIG. 5, the power steering controller 100a includes the operation detection part 110a. The operation detection part 110a detects whether the driver of the vehicle has performed an operation. The operation detection part 110a inputs the information indicating the operation of the driver of the vehicle from the operation part 33a.

The driving mode switching part 107 switches to the manual steering mode when the second override determination part 106 determines that the manual steering is possible due to the operation detection part 110a detecting that the driver has performed the operation. By having the driving mode switching part 107 switch to the manual steering mode by the operation to the operation detection part 110a by the driver in this manner, the power steering controller 100a can stop the automatic steering mode or the semi-automatic steering mode and switch to the manual steering mode according to the driver's intention.

Variation Example 6

In the above embodiment, the contact detection part 104 calculates an estimated value of the driver input torque applied to the steering wheel 21 on the basis of the steering torque information acquired from the torque detection part 102 and the steering angle information acquired from the steering angle detection part 103. Cases have been shown where the contact detection part 104 determines whether the driver of the vehicle is touching the steering wheel 21 on the basis of the estimated value of the calculated driver input torque, but the present invention is not limited thereto.

The contact detection part 104 may determine whether the driver of the vehicle is touching the steering wheel 21 on the basis of a standard deviation of the steering torque acquired from the torque detection part 102. When the driver of the vehicle is gripping the steering wheel 21, a slight hold of the driver of the vehicle is transmitted to the steering wheel 21, and the standard deviation of torque tends to increase.

In this case, the contact detection part 104 calculates the standard deviation of a plurality of steering torques acquired from the torque detection part 102 within a predetermined period. The contact detection part 104 may determine that the driver of the vehicle is touching the steering wheel 21 when the calculated standard deviation of the steering torque is equal to or greater than a predetermined third threshold value. On the other hand, the contact detection part 104 may determine that the driver of the vehicle is not touching the steering wheel 21 when the calculated standard deviation of the steering torque is less than the predetermined third threshold value. The third threshold value is a value set in advance on the basis of a variation amount of the wheels 28 due to a load applied to the wheels 28 during traveling.

Variation Example 7

In the above embodiment, the contact detection part 104 calculates the differential equation in which the steering torque and the steering angle are applied to the equation of state, which is converted from the equation of motion of the steering wheel 21. Cases have been shown where the contact detection part 104 calculates the estimated value of the driver input torque applied to the steering wheel 21 by solving the calculated equation, but the present invention is not limited thereto.

The contact detection part 104 calculates a first torque in which noise components of the steering torque are reduced using a linear filter having predetermined frequency characteristics and the steering torque, for example. The linear filter includes a low pass filter, for example. The contact detection part 104 calculates a second torque corresponding to the steering angle using an inverse characteristic filter and the steering angle. The inverse characteristic filter outputs a value of the corresponding second torque when the value of the steering angle is input. Such an inverse characteristic filter is a filter constructed on the basis of an equation of motion indicating a relationship between the steering angle, the steering torque, and a driver input torque applied to the steering wheel 21.

Here, the second torque is torque of the motor 22 such that the angle of the steering wheel 21 becomes the acquired steering angle when the driver of the vehicle is in the hands-off state. The contact detection part 104 may calculate an estimated value of the driver input torque applied to the steering wheel 21 on the basis of a difference between the calculated first torque and the calculated second torque.

The first torque is the steering torque in which noise components are reduced. The second torque is the steering torque corresponding to the steering angle when the noise components are ignored. Therefore, when the driver of the vehicle is in the hands-off state, the difference between the first torque and the second torque becomes almost zero. On the other hand, when the driver of the vehicle is in the hands-on state, the value obtained by subtracting the first torque from the second torque is approximately equal to the driver input torque applied to the steering wheel 21 by the driver of the vehicle.

[Effects of the Power Steering Controller 100 According to the Present Embodiment]

The power steering controller 100 according to the present embodiment includes the first override determination part 105 that determines whether the automatic steering of the vehicle is possible on the basis of the state of the vehicle, and the second override determination part 106 that determines whether the manual steering of the vehicle is possible on the basis of the state of the driver of the vehicle. Further, the power steering controller 100 includes the driving mode switching part 107 that switches between the automatic steering mode in which the vehicle is automatically steered, the manual steering mode in which the vehicle is manually steered, and the semi-automatic steering mode in which the vehicle is automatically steered and manually steered, on the basis of the determination result of the first override determination part 105 and the determination result of the second override determination part 106.

The power steering controller 100 includes the driving mode switching part 107 that switches between the automatic steering mode, the manual steering mode, and the semi-automatic steering mode on the basis of the determination result of the first override determination part 105 and the determination result of the second override determination part 106 in this manner. Therefore, the power steering controller 100 determines in which of three modes the vehicle is to be driven, on the basis of the plurality of override determinations. Accordingly, the power steering controller 100 can easily perform control suitable for the state of the vehicle or the state of the driver of the vehicle.

The present disclosure is explained on the basis of the exemplary embodiments. The technical scope of the present disclosure is not limited to the scope explained in the above embodiments and it is possible to make various changes and modifications within the scope of the disclosure. For example, all or part the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS 10, 10a Automatic steering system
20 Power steering
21 Steering wheel
22 Motor
23 Worm
24 Worm wheel
25 First torsion bar
26 Second torsion bar
27 Actuator
28 Wheels
31 First detector
32 Second detector
33a Operation part
100, 100a Power steering controller
101 Control part
102 Torque detection part
103 Steering angle detection part
104 Contact detection part
105 First override determination part
106 Second override determination part
107 Driving mode switching part
108 Command value generation part
109 Motor control part
110a Operation detection part
120 Storage

The invention claimed is:

1. A power steering controller comprising:
    a processor coupled to a memory storing instructions for the processor to function as:
        a first override determination part that determines whether automatic steering of a vehicle is possible on a basis of a state of the vehicle;
        a second override determination part that determines whether manual steering of the vehicle is possible on the basis of a state of a driver of the vehicle;
        a driving mode switching part that switches between an automatic steering mode for automatically steering the vehicle, a manual steering mode for manually steering the vehicle, and a semi-automatic steering mode for automatically steering and manually steering the vehicle, on the basis of a determination result of the first override determination part and a determination result of the second override determination part;
        a torque detection part that detects torque generated in a steering wheel of the vehicle; and
        a contact detection part that detects whether the driver is touching the steering wheel,
    wherein the driving mode switching part switches to the semi-automatic steering mode in a case where:
        the first override determination part determines that the automatic steering is not possible because the torque detected by the torque detection part is equal to or greater than a predetermined first threshold value; and
        the second override determination part determines that the manual steering is not possible, due to the contact detection part detecting that the driver is not touching the steering wheel.

2. The power steering controller according to claim 1, wherein
    the driving mode switching part switches to the manual steering mode in a case where 1 the first override determination part determines that the automatic steering is not possible because the torque detected by the torque detection part is equal to or greater than a predetermined first threshold value and (ii) the second override determination part determines that the manual steering is possible, due to the contact detection part detecting that the driver is touching the steering wheel.

3. The power steering controller according to claim 1, wherein the processor further functions as:
    a steering angle detection part that detects a steering angle of the steering wheel, wherein
    the contact detection part calculates an estimated value of driver input torque applied to the steering wheel on the basis of the torque detected by the torque detection part and the steering angle detected by the steering angle detection part, and determines whether the driver is touching the steering wheel on the basis of the calculated estimated value of the driver input torque.

4. The power steering controller according to claim 1, wherein
    the driving mode switching part switches to the semi-automatic steering mode in a case where (i) the first override determination part determines that the automatic steering is possible because the torque detected by the torque detection part is less than a predetermined first threshold value and (ii) the second override determination part determines that the manual steering is possible, due to the contact detection part detecting that the driver is touching the steering wheel.

5. The power steering controller according to claim 1, wherein
    the driving mode switching part switches to the automatic steering mode in a case where the first override determination part determines that the automatic steering is possible because the torque detected by the torque detection part is less than a predetermined first threshold value and (ii) the second override determination part determines that the manual steering is not possible, due to the contact detection part detecting that the driver is not touching the steering wheel.

6. The power steering controller according to claim 1, wherein the processor further functions as:
    a steering angle detection part that detects a steering angular velocity of a steering wheel of the vehicle,
    wherein the first override determination part determines whether the automatic steering of the vehicle is possible on the basis of the steering angular velocity detected by the steering angle detection part.

7. The power steering controller according to claim 1, wherein the processor further functions as:
    a failure detection part that detects whether a first detector that detects torque generated in a steering wheel of the vehicle or a second detector that detects a steering angular velocity of the steering wheel is broken,
    wherein the first override determination part determines whether the automatic steering of the vehicle is possible on the basis of a detection result of the failure detection part.

8. The power steering controller according to claim 1, wherein the processor further functions as:
    an operation detection part that detects whether the driver has performed an operation,
    wherein the second override determination part determines whether the manual steering of the vehicle is possible on the basis of a detection result of the operation detection part.

9. A power steering control method implemented by a computer, the method comprising:
    a first override determination step of determining whether automatic steering of a vehicle is possible on a basis of a state of the vehicle;
    a second override determination step of determining whether manual steering of the vehicle is possible on the basis of a state of a driver of the vehicle;
    a driving mode switching step of switching between an automatic steering mode in which the vehicle is automatically steered, a manual steering mode in which the vehicle is manually steered, and a semi-automatic steering mode in which the vehicle is automatically steered and manually steered, on the basis of a determination result of the first override determination step and a determination result of the second override determination step;
    a torque detection step of detecting torque generated in a steering wheel of the vehicle; and
    a contact detection step of detecting whether the driver is touching the steering wheel,
    wherein the driving mode switching step switches to the semi-automatic steering mode in a case where:
        the first override determination step determines that the automatic steering is not possible because the torque detected by the torque detection step is equal to or greater than a predetermined first threshold value; and the second override determination step determines that the manual steering is not possible, due to the contact detection step detecting that the driver is not touching the steering wheel.

* * * * *